United States Patent Office 2,891,982
Patented June 23, 1959

2,891,982
OXIDATION PROCESS FOR OBTAINING A PRODUCT OF IMPROVED COLOR CHARACTERISTICS

George P. Brown, Jr., West Deer Township, Allegheny County, Pa., assignor to Gulf Research & Development Company, Pittsburgh, Pa., a corporation of Delaware No Drawing. Application September 14, 1956
Serial No. 609,817

8 Claims. (Cl. 260—451)

This invention relates to a process of oxidizing a hydrocarbon with a gas containing molecular oxygen, and more particularly to a process for oxidizing a paraffinic hydrocarbon with a gas containing molecular oxygen while maintaining product quality.

Products which are both useful in themselves and which are also intermediates for production of acids and other oxygenated products can be prepared by oxidizing a hydrocarbon, preferably a liquid hydrocarbon at reaction temperature with a gas containing molecular oxygen, such as air, at an elevated temperature for specified periods of time. During oxidation the reaction mixture has an attractive light color but soon turns to a brownish color when, after oxidation is complete, the reaction mixture is permitted to cool to room temperature. This results in product degradation and renders the same commercially unattractive.

I have found that a hydrocarbon, particularly a paraffinic hydrocarbon, can be oxidized with a gas containing molecular oxygen to obtain an oxidized mixture having an attractive light color, which color can be maintained by reducing the time which the oxidized product spends in the absence of said gas between the reaction temperature and a critical temperature lying below said reaction temperature. This improvement can be effected by (a) maintaining intimate contact between the oxidized paraffinic hydrocarbon and a gas containing molecular oxygen during the cooling period between the temperature at which the oxidation occurs and the lower critical temperature; (b) rapidly chilling the oxidized mixture from reaction temperature to said lower critical temperature; or (c) a combination of both. The critical temperature referred to above is about 212° F. When the reaction mixture has been cooled to this temperature, further cooling thereof to a lower temperature such as room temperature can be indiscriminate, for further color degradation of the oxidized mixture does not occur.

In maintaining contact between the oxidized product and the gas containing molecular oxygen from reaction temperature to a temperature of 212° F. to avoid color degradation thereof, the rate of introduction of gas which must be used can be raised, maintained or lowered from the rate used during the reaction. However, in the event a lower rate of gas introduction is used during the cooling step, the rate must be equivalent to at least about 25 cc. of oxygen and preferably at least about 50 cc. of oxygen per minute per kilogram of oxidized product. The gas used during the cooling stage must be one containing molecular oxygen, preferably similar in composition to that used during the oxidation stage, for not all gases are operative during the cooling stage.

When the method used to cool the oxidized product from reaction temperature to a temperature of about 212° F. involves chilling the same, such chilling should be of short duration and must be effected in less than about five minutes, preferably in less than about three minutes. Any effective means to obtain rapid cooling can be used. For example, cooling can be obtained by passing the oxidized product through a heat exchanger. This method of cooling is particularly useful on occasions in which the supply of gas containing molecular oxygen is interrupted through accident and it becomes impossible to maintain the gas containing molecular oxygen dispersed in the hydrocarbon and its oxidation products during its passage through the critical temperature range.

When the combination of the above is used to get the oxidized mixture from reaction temperature to a temperature of about 212° F., the length of time required to effect the necessary temperature drop is not critical provided the gas containing molecular oxygen is used during the cooling stage at a rate of introduction equivalent to at least about 25 cc., and preferably at least about 50 cc. of oxygen per minute per kilogram of oxidized mixture.

Saturated aliphatic hydrocarbons boiling above about 250° F. and having eight or more carbon atoms, or mixtures thereof, can be employed as charge stock in the oxidation process of this invention, although, for ease of operation, I prefer to employ saturated aliphatic hydrocarbons having from about 10 to about 40 carbon atoms. Included among the saturated aliphatic hydrocarbons which can be employed in the process are petroleum waxes, paraffinic oils, foots oils, oils and waxes obtained from the Fischer-Tropsch process, n-octane, decane, cetane, etc. While I prefer to employ charge stocks consisting of saturated aliphatic hydrocarbons, I can also employ charge stocks which are predominantly saturated aliphatic hydrocarbons and which contain cycloparaffins. Such charge stocks can be prepared from a variety of types of crude oils. When the crude oil is essentially paraffinic, the charge may be recoved by distillation, but when the crude oil is of a mixed type, various combinations of treatments can be employed to obtain the charge, such as distillation and solvent extraction, distillation and crystallization, or chromatographic separation.

The paraffinic hydrocarbon is oxidized in accordance with the process described herein with a gas containing molecular oxygen such as air. The oxidation is continued for a time to obtain an oxidation product having a saponification number above about 100 and preferably between about 150 and 450. A catalyst, such as vanadium pentoxide, can be employed to facilitate oxidation. While the reaction can be carried out at elevated pressures up to about 100 pounds per square inch, I prefer to effect oxidation at atmospheric pressure. Oxidation with the gas containing molecular oxygen can be carried out at temperatures of about 250° to about 420° F. The amount of gas containing molecular oxygen which must be used during the oxidation stage, considered as oxygen and based at 72° F. and atmospheric pressure, is at least 400 cc. of gas per minute per kilogram of hydrocarbon being oxidized, and preferably about 500 to about 2500 cc. of gas per minute. The air-oxidized product obtained comprises oxygenated compounds such as organic acids, esters, and aldehydes. This product can be treated to separate the separate constituents therefrom or can further be oxidized with nitric acid in accordance with a process such as disclosed in application Serial No. 376,616, and now U.S. Patent No. 2,771,482, filed August 26, 1953, by Brown et al. and assigned to the assignee of this invention, to obtain a mixture containing dibasic acids.

As noted, in order to prevent color degradation of the product obtained from oxidation with a gas containing molecular oxygen, the time interval in which the air oxidation product spends in the absence of such gas between reaction temperature and a temperature of about 212° F. is maintained as short as possible. When the oxidized product is cooled to a temperature below the reaction temperature but above 212° F. and is subsequently treated at the intermediate temperature the same cooling procedure outlined above is used. For example, in the event a paraffin wax is air-oxidized at 300° F., cooled to a temperature of 250° F., and at the latter temperature is further oxidized with nitric acid to obtain a mixture containing dibasic acids, the same procedures outlined above in cooling from reaction temperature to 212° F. are employed in cooling the air-oxidized wax from 300° to 250° F. In this way the final product partakes of the improvement of the intermediate.

The process of this invention can be illustrated by reference to the following examples. Example I clearly shows color degradation occurring in a paraffin hydrocarbon oxidized in air and thereafter indiscriminately cooled to a lower, non-reactive temperature.

*Example I*

Three thousand grams of deoiled foots oil containing one per cent of the original oil was air blown at the rate of 7.6 liters of air, having a temperature of 72° F., per minute at a temperature of 320° F. and atmospheric pressure. At the end of 11 hours the air-oxidized mixture had a saponification number of 235 and a color rating of 2 minus (ASTM D155–45T Supplement B). The air-oxidized mixture was then permitted to cool over a period of 50 minutes to 212° F. and the color rating had increased to 3½ (an increase in color rating indicating color degradation). Further cooling below 212° F. did not result in a further change in color rating.

Example II below illustrates the advantages of cooling the air-oxidized mixture in accordance with the present invention.

*Example II*

Deoiled foots oil was oxidized in air as in Example I. At the end of 11 hours, the air rate was reduced to 800 cc. per minute and this was continued while the oxidized mixture was permitted to cool to 210° F. over a period of 50 minutes. The color of the air-oxidized product at the end of 11 hours was 2 minus and remained unchanged at the end of the cooling period. Further cooling of the air-oxidized product to room temperature did not produce a further change in color of the product.

That the use of gases other than a gas containing molecular oxygen is ineffective for purposes of this invention is clearly shown below in Example III.

*Example III*

Deoiled foots oil was air-oxidized as in Example I to obtain a mixture having a saponification number of 212 and a color slightly less than 2. At the end of 11 hours, the flow of air was discontinued and 800 cc. of nitrogen per minute was passed through the air-oxidized mixture for 50 minutes until the temperature of the mixture had reached 205° F. The color of the mixture was thereby increased to 2½.

Example IV below shows that the air rate need not be reduced during the cooling step and that cooling from reaction temperature to a temperature below about 212° F. in less than about 5 minutes will inhibit color degradation of the oxidized product.

*Example IV*

Under the conditions of Example I, 3000 grams of deoiled foots oil were oxidized to a product having a saponification number of 256 and a color rating of 2. At the end of 11 hours, air flow at the rate of 7.6 liters per minute was continued over a period of 25 minutes while the oxidized product was cooled with additional external cooling to a temperature of 210° F. The color rating remained 2. When a sample of the oxidized product was cooled from reaction temperature to a temperature of 210° F. in three minutes, the color rating was 2 when the latter temperature was reached.

Examples V and VI below illustrate the process of this invention using paraffin wax as charge.

*Example V*

Three thousand grams of a paraffin wax having a melting point of 132° F. was air-oxidized under the conditions set forth in Example I to obtain an air-oxidation product having a saponification number of 237 and a color rating of 2 minus. When the wax was cooled from the reaction temperature of 320° F. to a temperature of 212° F. in 2 minutes, the color rating at the latter temperature remained unchanged. Permitting the oxidized mixture to cool to 212° F. over a period of 45 minutes in the absence of the added air resulted in a product having a color rating of 2½ minus.

*Example VI*

As in Example V, paraffin wax having a melting point of 132° F. was air-oxidized to a product having a saponification number of 231 and a color rating of 2 minus. Samples of this product were cooled from the reaction temperature of 320° F. to a temperature of 210° F. over a period of 2 minutes without additional air as well as over a period of 40 minutes with additional air. In the latter case the air rate was reduced during the cooling period to 800 cc. per minute. The color rating of the cooled product remained unchanged.

Obviously, many modifications and variations of the invention, as hereinabove set forth, can be made without departing from the spirit and scope thereof, and therefore only such limitations should be imposed as are indicated in the appended claims.

I claim:

1. A process for oxidizing a paraffinic hydrocarbon and hydrocarbon mixtures comprised predominantly of paraffinic hydrocarbons which comprises oxidizing said hydrocarbon with a gas containing molecular oxygen at a temperature above about 212° F. to obtain an oxidized mixture having a saponification number above about 100, and thereafter cooling said mixture to a temperature of about 212° F. in less than about five minutes, whereby the original color of the oxidized mixture is substantially maintained.

2. A process for oxidizing a paraffinic hydrocarbon and hydrocarbon mixtures comprised predominantly of paraffinic hydrocarbons which comprises oxidizing said hydrocarbon with a gas containing molecular oxygen at a temperature above about 212° F. to obtain an oxidized mixture having a saponification number above about 100, and thereafter cooling said mixture to a temperature of about 212° F. in less than about three minutes, whereby the original color of the oxidized mixture is substantially maintained.

3. A process for oxidizing a paraffinic hydrocarbon and hydrocarbon mixtures comprised predominantly of paraffinic hydrocarbons which comprises oxidizing said hydrocarbon with a gas containing molecular oxygen at a temperature above about 212° F. to obtain an oxidized mixture having a saponification number above about 100, and thereafter cooling said mixture to a temperature of about 212° F. while maintaining in intimate contact with such mixture a gas containing molecular oxygen at a rate equivalent to at least about 25 cc. of oxygen per minute per kilogram of oxidized product during the cooling, and thereafter upon reaching said latter temperature terminating the contact of said gas containing molecular oxygen, whereby the original color of the oxidized mixture is substantially maintained.

4. A process for oxidizing a paraffinic hydrocarbon and hydrocarbon mixtures comprised predominantly of paraffinic hydrocarbons which comprises oxidizing said hydrocarbon with a gas containing molecular oxygen at a temperature above about 212° F. to obtain an oxidized mixture having a saponification number above about 100, and thereafter cooling said mixture to a temperature of about 212° F. while maintaining in intimate contact with such mixture a gas containing molecular oxygen at a rate equivalent to at least about 50 cc. of oxygen per minute per kilogram of oxidized product during the cooling, and thereafter upon reaching said latter temperature terminating the contact of said gas containing molecular oxygen, whereby the original color of the oxidized mixture is substantially maintained.

5. A process for oxidizing paraffin wax which comprises oxidizing said paraffin wax with air at a temperature above about 212° F. to obtain a mixture having a saponification number above about 100, and thereafter cooling said mixture to a temperature of about 212° F. in less than about five minutes, whereby the original color of the oxidized mixture is substantially maintained.

6. A process for oxidizing paraffin wax which comprises oxidizing said paraffin wax with air at a temperature above about 212° F. to obtain a mixture having a saponification number above about 100, and thereafter cooling said mixture to a temperature of about 212° F. in less than about three minutes, whereby the original color of the oxidized mixture is substantially maintained.

7. A process for oxidizing foots oil which comprises oxidizing said foots oil with air at a temperature above about 212° F. to obtain a mixture having a saponification number above about 100, and thereafter cooling said mixture to a temperature of about 212° F. while maintaining in intimate contact with such mixture a gas containing molecular oxygen at a rate equivalent to at least about 25 cc. of oxygen per minute per kilogram of oxidized product during the cooling, and thereafter upon reaching said latter temperature terminating the contact of said gas containing molecular oxygen, whereby the original color of the oxidized mixture is substantially maintained.

8. A process for oxidizing foots oil which comprises oxidizing said foots oil with air at a temperature above about 212° F. to obtain a mixture having a saponification number above about 100, and thereafter cooling said mixture to a temperature of about 212° F. while maintaining in intimate contact with such mixture a gas containing molecular oxygen at a rate equivalent to at least about 50 cc. of oxygen per minute per kilogram of oxidized product during the cooling, and thereafter upon reaching said latter temperature terminating the contact of said gas containing molecular oxygen, whereby the original color of the oxidized mixture is substantially maintained.

References Cited in the file of this patent

UNITED STATES PATENTS

| | | |
|---|---|---|
| 1,991,344 | Burke et al. | Feb. 12, 1935 |
| 2,476,417 | Jarnagin | July 19, 1949 |
| 2,729,665 | Buckman | Jan. 3, 1956 |
| 2,789,123 | Thompson | Apr. 16, 1957 |